United States Patent [19]

Thümmler et al.

[11] 4,176,765

[45] Dec. 4, 1979

[54] SELF-CLEANING BUCKET WHEEL LOCK

[75] Inventors: Ursus Thümmler, Erftstadt; Hugo Werner, Hurth-Hermulheim; Harry Sander, Sindorf, all of Fed. Rep. of Germany

[73] Assignee: Hoechst Aktiengesellschaft, Frankfurt am Main, Fed. Rep. of Germany

[21] Appl. No.: 876,250

[22] Filed: Feb. 9, 1978

[30] Foreign Application Priority Data

Feb. 12, 1977 [DE] Fed. Rep. of Germany ....... 2706047

[51] Int. Cl.² ............................................. G01F 11/00
[52] U.S. Cl. .................................... 222/218; 222/368
[58] Field of Search ................ 222/368, 346, 216–225

[56] References Cited

U.S. PATENT DOCUMENTS

| 2,824,675 | 2/1958 | Pepitone et al. | 222/217 |
| 3,446,404 | 5/1969 | Metha | 222/368 |

*Primary Examiner*—Allen N. Knowles
*Attorney, Agent, or Firm*—Connolly and Hutz

[57] ABSTRACT

Self-cleaning bucket wheel lock comprising several cells or compartments. The apparatus which permits coalescent material to be introduced into a closed apparatus comprises a casing with a material inlet and discharge outlet, and a rotor basket. The rotor basket is mounted in position on a drive shaft passing through the casing and an elastic hose is secured to the rotor basket. The hose enables the volume of each cell to be varied whenever the drive shaft is caused to rotate.

10 Claims, 2 Drawing Figures

SELF-CLEANING BUCKET WHEEL LOCK

This invention relates to a self-cleaning bucket wheel lock or sluice permitting coalescent material to be introduced into a closed apparatus, the lock or sluice comprising a casing, which is provided with a material inlet and material outlet, and a rotor basket mounted on a drive shaft passing through the casing.

In all those cases, in which coalescent or glutinous or thixotropic material is to be introduced or metered into an apparatus by means of a bucket wheel lock or sluice, the individual compartments or cells of the bucket wheel lock or sluice are liable to become gradually clogged, so that it is necessary for them to be frequently cleaned. In addition to this, the effective cell volume varies continually so that it is practically impossible to supply exactly metered quantities of material.

Various bucket wheel locks or sluices which are said to be self-cleaning or of which the individual compartments or cells are less liable to become clogged with coalescent material have already been described.

In one of these bucket wheel locks, the cleaning means is a lever bent like a hook at one of its ends, which is rotatably mounted below the rotor and of which the hooked end is forced by means of a spring to reach into the lower cell. Whenever, a rotary motion is imparted to the rotor basket, the scraper lever is forced into contact with each cell and material which may have deposited therein is scraped off.

Another known bucket wheel lock is provided with a hollow rotor which has a plurality of rubber shells bonded to its inside. Placed in the interior of the rotor is a plurality of rubber-lined iron balls. Whenever the rotor is turned, the iron balls are initially lifted up to the vertex. They then drop down and impinge on the rubber shells which are set in vibration, especially that rubber shell which is just discharged from material.

A disadvantage associated with the bucket wheel lock first described above resides in the fact that the scraper level reaches into the stream of material coming from the lock or sluice. In other words, whenever material begins to agglomerate on the scraper lever the discharge outlet of the bucket wheel lock is liable to become gradually clogged.

A disadvantage associated with the bucket wheel lock last described above resides in the fact that the rubber-lined iron balls are dropped on the rubber shells from a height which does frequently not permit the rubber shells to be vibrated and deformed to the extent which would be necessary for the automatic self-cleaning of the individual cells, except in those cases in which use is made of rubber shells of extremely small wall thickness, e.g. of less than 1 mm, and of short service life. In addition to this, the rubber shells are not very reliably bonded to the metal casing.

It is therefore an object of the present invention to provide a reliable self-cleaning bucket wheel lock or sluice, which enables the cell volume to be pulsatingly varied in accordance with the speed of the bucket wheel lock, without the need to use elements which would reach into the stream of material, or unreliable bond connections. To this end, the invention provides for a rotor basket to be mounted on a driving shaft and for a closed elastic hose to be secured to the rotor basket, the hose permitting the volume of each individual cell to be varied whenever the drive shaft is turned.

Further preferred features of the present invention provide:
(a) for the hose to be secured to the rotor basket by means of one or more ledges;
(b) for the hose to have a plurality of apertured lugs secured to its inside, the individual lugs being arranged so as to be spaced from each other;
(c) for a metallic sleeve to be inserted into the aperture provided in each lug;
(d) for the sleeve to be a steel sleeve;
(e) for a star with several arms to be arranged in the interior of the hose, the individual arms having bifurcated and apertured ends;
(f) for the individual cams to be apertured in the region of the bifurcated arm ends of the star and to have bolts passed therethrough;
(g) for a shaft to be extended through the casing at its side opposite the drive shaft and to be rigidly connected to the center of the star, the shaft being arranged so as to be displaced eccentrically with respect to the drive shaft and so as to be spaced therefrom;
(h) for the shaft to be spaced from the drive shaft at a separation equal to 3 to 10%, preferably 4 to 6%, of the diameter of the rotor basket; and
(i) for the hose to be a rubber hose.

Whenever the drive shaft of the bucket wheel lock or sluice of this invention is caused to rotate once about its axis, the volume of each cell is invariably modified and material is forced to issue through the discharge outlet so that the cell is substantially not liable to become clogged by thixotropic material.

In the present apparatus, the forces effecting the variation of the volume of each cell or compartment between the material inlet and discharge outlet are substantially not limited in magnitude so that the hose can be made thicker which means longer service life.

In addition to this, the hose is easy to exchange without the need to dismantle the drive or drive shaft. It is only necessary to loosen several screws or bolts on the side opposite the drive shaft. After this has been done, it is possible to laterally remove the rotor basket from the bucket wheel lock. Next, the ledges are loosened and the hose can be removed from the rotor basket.

In the present bucket wheel lock, use may be made of a hose of textile or plastics materials or leather. The ledges which are used to secure the hose to the rotor basket provide a gas-tight connection between the hose and the rotor basket.

The number of lugs which are vulcanized to the inside of the hose should correspond to the number of cells provided in the bucket wheel lock. The metallic sleeves installed in the apertures of the individual cams may also be made of bronze, red cast iron or cast iron.

An exemplary embodiment of the apparatus of this invention is shown diagrammatically in the accompanying drawings, of which:

Figure 1:
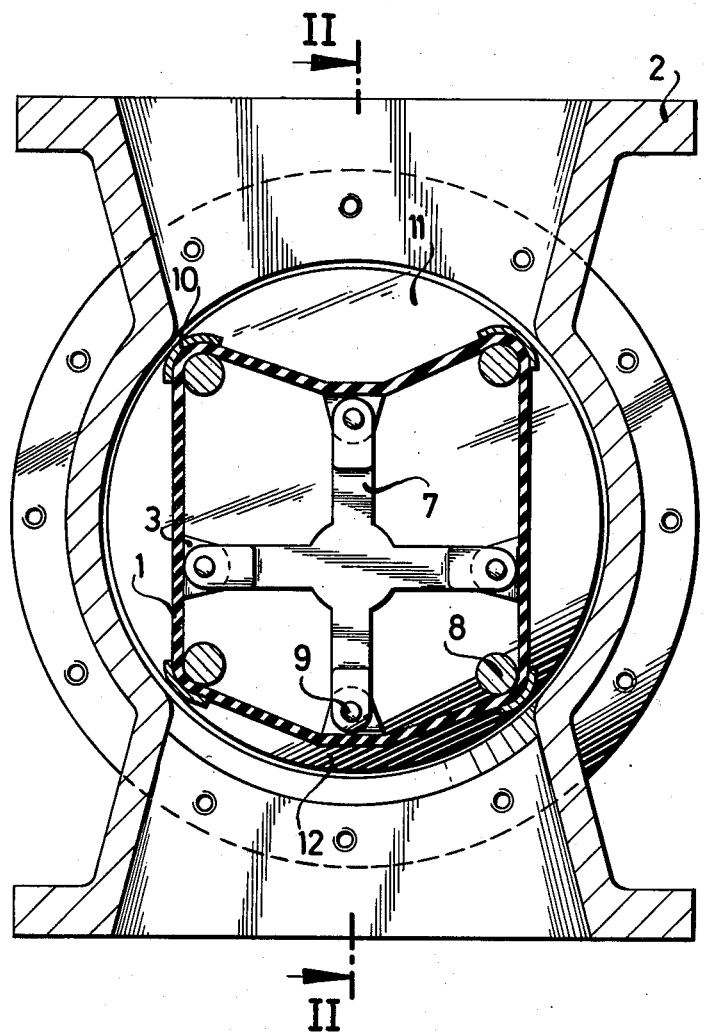
FIG. 1 is a top plan sectional view of the bucket wheel lock or sluice.
Figure 2:
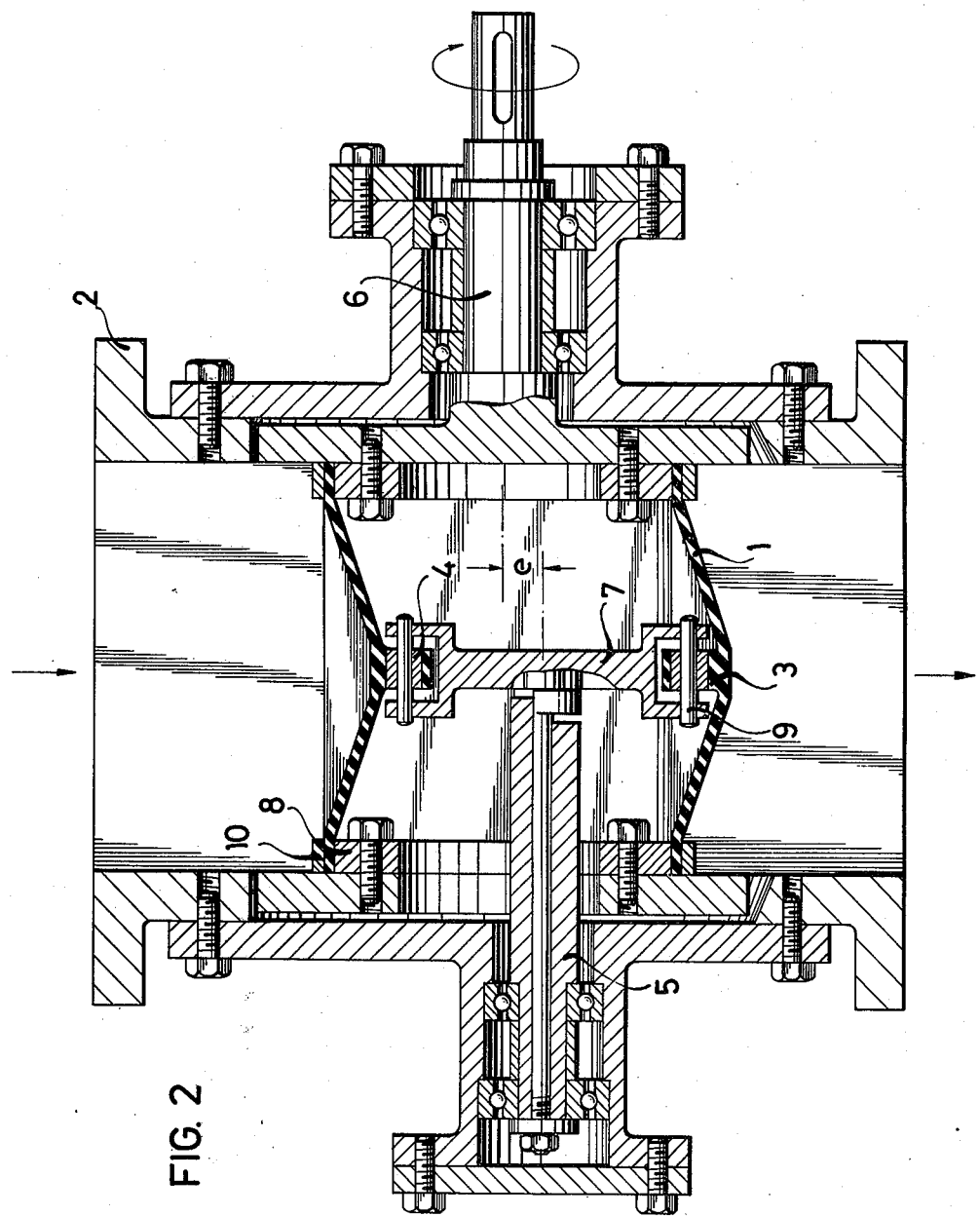
FIG. 2 is a side view of the bucket wheel lock, taken along line II . . . II in FIG. 1.

A rotor basket 8 is arranged in a casing 2. Accomodated in one of its ends is a bearing drive shaft 6, the other opposite end being open.

Slipped over, and secured by means of ledges 10 to, the rotor basket 8 is a closed rubber hose 1, which determines the cell structure. Fastened to the inside of the hose 1, in the center region of each cell or compartment, is a lug 3 embedding a steel sleeve 4.

A shaft 5, which is displaced eccentrically with respect to the drive shaft 6 and spaced therefrom at a separation e, is mounted so as to reach into the open end of the rotor basket 8. The end of shaft 5, which reaches into the interior of the rotor basket 8, has a star fastened to it, of which the various arms have bifurcated and apertured ends. Mounted between the bifurcated ends are the sleeve-fitted lugs 3 of the hose 1. The cams 3 with the bolts 9 passed therethrough enable the drive shaft 6 to be rigidly connected to the shaft 5.

As can be seen from the hatched portions of FIG. 1, a cell or compartment of maximum volume (as shown at 11) is available upon the introduction of feed material thereinto. Upon the discharge of material, the hose is tilted over, and the eccentric shaft 5 and the drive shaft 6 cause the cell colume to be reduced (as shown at 12).

The bucket wheel lock or sluice of this invention can be used, for example, for metering coalescent filtered moist red phosphorus into a drier operated under protective gas.

We claim:

1. Self-cleaning bucket wheel lock with several cells for introducing coalescent material into a closed apparatus, which comprises a casing with a material inlet and discharge outlet; a rotor basket mounted on a driving shaft passing into the casing; a closed elastic hose forced on the rotor basket, said hose having secured to its inside a plurality of lugs being spaced apart from each other; a star with several arms being arranged in the interior of said hose and being connected to the lugs of said hose; and a shaft passing into the casing at its side opposite the driving shaft and extending through the casing so as to provide a rigid connection to the center of said star, said shaft being displaced eccentrically with respect to the driving shaft so as to be spaced therefrom at a separation e, whereby said hose permits the volume of each cell to be varied whenever the driving shaft is caused to rotate.

2. The self-cleaning bucket wheel lock as claimed in claim 1, wherein the hose is secured to the rotor basket by means of ledges.

3. The self-cleaning bucket wheel lock as claimed in claim 1, wherein the separation e is 3 to 10% of the diameter of the rotor basket.

4. The self cleaning bucket wheel lock as claimed in claim 3, wherein the separation e is 4 to 6% of the diameter of the rotor basket.

5. The self-cleaning bucket wheel lock as claimed in claim 1, wherein the hose is a rubber hose.

6. The self-cleaning bucket wheel lock as claimed in claim 1, wherein each lug is provided with a bore.

7. The self-cleaning bucket wheel lock as claimed in claim 6, wherein a metallic sleeve is inserted into said bore.

8. The self-cleaning bucket wheel lock as claimed in claim 7, wherein the sleeve is a steel sleeve.

9. The self-cleaning bucket wheel lock as claimed in claim 1, wherein each arm of said star terminates in a fork having two tines, and wherein said tines are provided with bores being in alignment with respect to one another.

10. The self-cleaning bucket wheel lock as claimed in claim 9, wherein each lug secured to the hose is provided with a bore in the region between said bored tines, and said lug and said tines being connected together by means of bolts.

* * * * *